March 30, 1937.  H. J. BAKER  2,075,600
VALVE
Filed Jan. 9, 1934  2 Sheets-Sheet 1

INVENTOR
HARRY J. BAKER.
BY
ATTORNEY

March 30, 1937. H. J. BAKER 2,075,600
VALVE
Filed Jan. 9, 1934 2 Sheets-Sheet 2
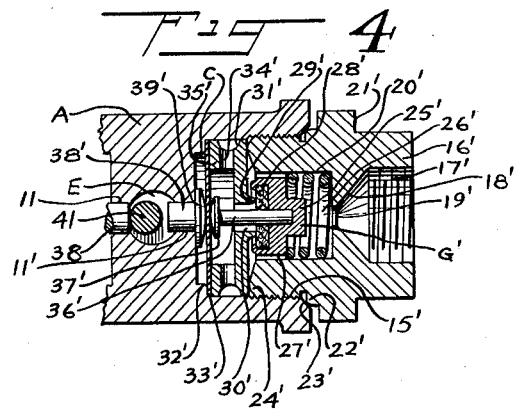
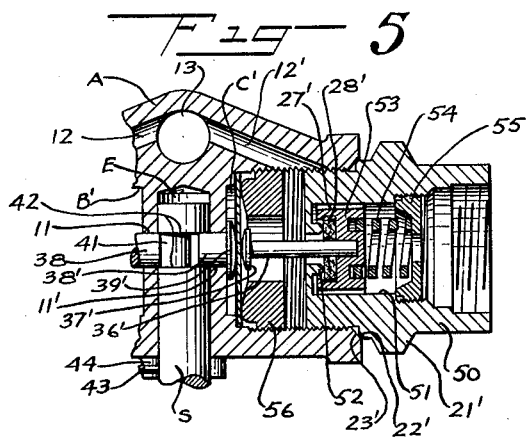
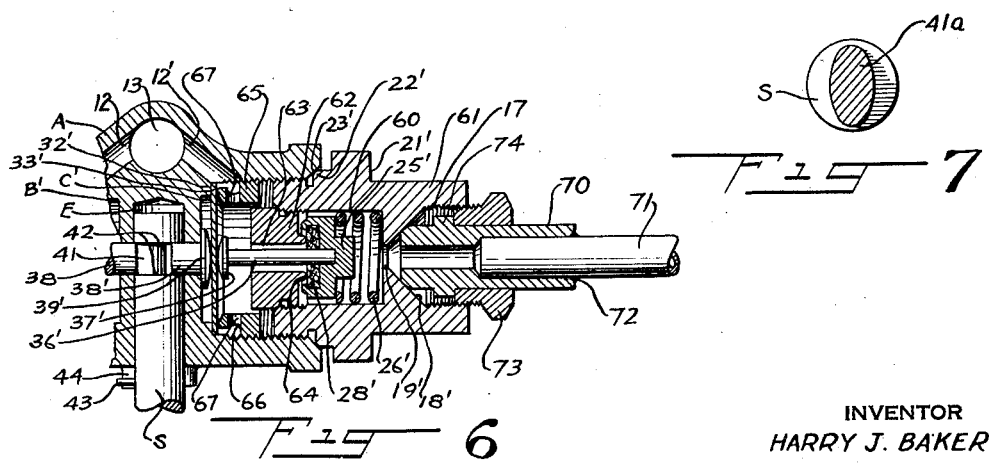
INVENTOR
HARRY J. BAKER.
BY
*E. L. Greenewald*
ATTORNEY Patented Mar. 30, 1937

2,075,600

UNITED STATES PATENT OFFICE 2,075,600

VALVE

Harry J. Baker, Indianapolis, Ind., assignor, by mesne assignments, to Union Carbide and Carbon Corporation, a corporation of New York Application January 9, 1934, Serial No. 705,849

30 Claims. (Cl. 277—20)

This invention relates to improvements in valves and more particularly relates to an improved valve for controlling the flow of fluid from branch conduits to a single conduit, or vice versa.

The principal objects of this invention are: To provide a simple and efficient fluid-control valve of the so-called packless type; to provide a multiple-way valve having a single operating means for readily directing the flow of fluid through any one of a plurality of valve ports, and for shutting off the fluid flow through any or all ports, as desired; and to provide an improved, compact and easily assembled two-way valve of the packless type for conveniently controlling the flow of fluid from either or both of two branch conduits to a single conduit, or vice versa.

The above and other objects and the novel features of this invention will become apparent from the following description and the accompanying drawings, of which Fig. 1 is a cross-sectional view of a multiple-way valve embodying this invention;

Fig. 4 is a cross-sectional view of a portion of the valve taken on the line 4—4 in Fig. 1;

Figs. 5 and 6 are partial sectional views of other valves embodying this invention; and Fig. 7 is a cross-sectional view showing an alternative form of shaft and cam for opening both valves simultaneously.

Figure 1:
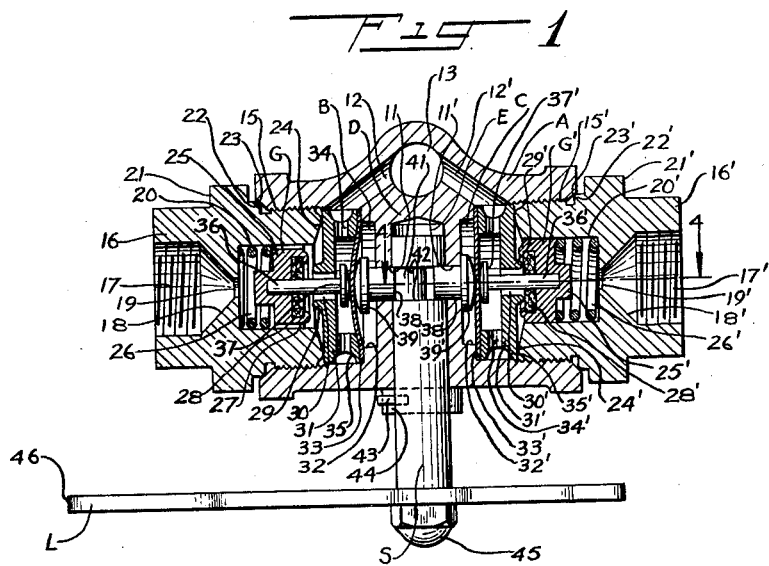
Figure 2:
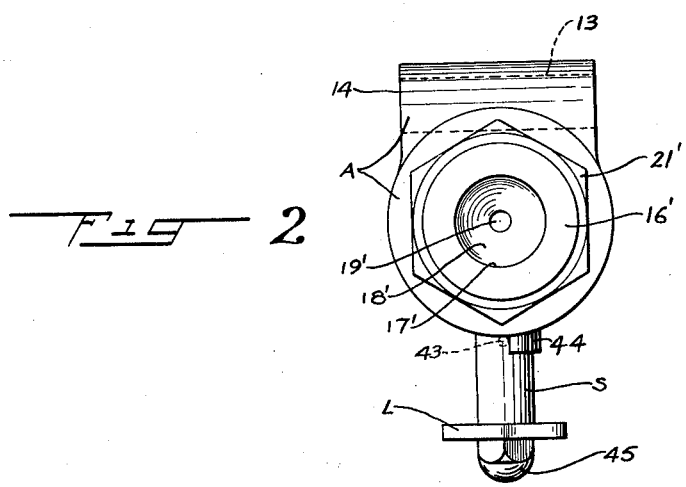
Fig. 2 is an elevational view of the valve showing outlet and gauge connections.
Figure 3:
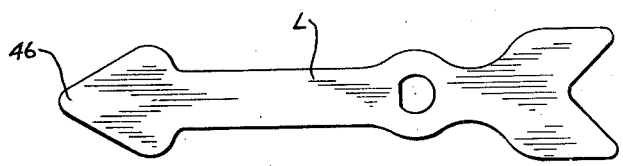
Fig. 3 is an elevation of the throw-over lever only.

Referring to the drawings, one embodiment of this invention, as shown in Figs. 1 to 4, inclusive, comprises a metal valve body A which has two substantially identical cavities B and C arranged one on each side of a central dividing partition D, which is an integral part of the body A and has a cylindrical bore E therein. The cavities B and C preferably are axially in line, the axis of the bore E preferably is perpendicular to and intersects the common axis of the cavities, and openings 11, 11' extend through the wall of the bore into and axially in line with the cavities, so that valve mechanisms G, G' assembled in the cavities may be operated by a single operating member S in said bore. Branch passages 12 and 12' connect the cavity B and the cavity C respectively with a main passage 13 which may be conveniently situated centrally between the cavities and to one side thereof. This passage 13 serves either as an inlet or outlet for the fluid, depending on whether it is desired to divide the flow of fluid from a common source of supply or to deliver fluid from different sources through the cavities B and C to the passage 13. A suitable connection 14 intersecting the passage 13 may be employed as an outlet for attaching a gauge to measure the fluid pressure.

The respective entrances of the cavities are internally threaded, as at 15 and 15', to receive externally threaded bushings 16 and 16'. These bushings 16, 16' and the valve mechanisms in the cavities B and C are identical; and, for the sake of clearness, only one of the valve assemblies will be described in detail, like parts in the other assembly being designated by like numerals primed. The bushing 16 has a threaded opening 17, serving as an inlet or an outlet, as desired; and into this opening may be secured a suitable conduit or fitting for connecting the valve body A to a fluid container or other apparatus. At the base of the threads of the opening 17 the passage in the bushing tapers or narrows, as at 18, and then opens through a throat 19 into an enlarged cylindrical bore which provides a valve chamber or housing 20. The exterior of the bushing 16 may have a hexagonal head 21 for tightening the bushing into place and also a bevelled shoulder 22 adapted to contact and form a leakproof seal with a similarly bevelled area 23 on the valve body A. At its inner end the bushing 16 is chamfered, as at 24, to provide another sealing area to be described later.

A movable valve 25 and a compressible spring 26 are housed in the bore or chamber 20, the valve 25 being slidable within and guided by the bore but having the sides thereof cut away, as at 27, to permit the flow of fluid past the valve. A sealing disc 28 of resilient material may be secured to the head of valve 25 by the marginal inturned edge of the valve head. The valve 25 under pressure of the spring 26 seats tightly on a raised marginal area 29 encircling a port 30 centrally disposed in an annular clamping ring 31 which closes the bottom of the valve chamber 20. This ring 31 fits into the bottom of the cavity B (or C) where it bears against and clamps an imperforate, flexible metal diaphragm 33 against an interior shoulder 32 near the bottom of the cavity. The diaphragm serves both as a pressure-transmitting member and as a seating member to prevent fluid leakage from the cavity into the bore E.

The clamping ring 31 has a thickened marginal edge to leave a space between the inner side of the port 30 and the diaphragm 33 to permit the flow of fluid through the cavity or valve housing. When the bushing 16 is screwed into place, the inner end 24 thereof bears against the ring 31 to produce a leak-tight joint between the bushing and the ring, and also to press this ring tightly against the marginal edge of the diaphragm and the latter against the shoulder 32 to produce a leak-tight joint between the diaphragm and said shoulder. An exterior circumferential groove 35 in the clamping ring 31 and a plurality of radial passages 34 extending from said groove inwardly through the ring provide channels through which fluid may readily flow between the valve chamber 20 and the branch passage 12.

In order that the shaft S may open the valve 25 against the pressure of the closing spring 26, the valve is provided with a stem 36 which fits a recess in the valve head, extends through the port 30, and has a head 37 bearing against the outside of the diaphragm 33. A pressure-transmitting element or short pin 38, axially in line with the stem 36 and likewise having a head 39, is adapted to bear against the inside of the diaphragm 33. The pressure-transmitting element 38 is slidable in and guided by the opening 11 and projects into the bore E. Suitable means may be employed to force the pressure-transmitting element 38 against the diaphragm 33 and valve stem 36 to open the valve 25. It is preferred to employ a shaft S which is rotatably journalled in the bore E and has an eccentric or cam 41 adapted to engage and actuate the elements 38, 38' to unseat the valves. The cam 41 preferably is a reduced integral portion of the shaft S and is located opposite the openings 11, 11' when the shaft is in proper position in the bore E. When the valve 25 (or 25') is to be opened against compression of the spring 26 (or 26'), a partial turn of the shaft S will slide the pin 38 (or 38') axially in the opening 11 (or 11') and unseat either valve independently of the other. At all times the inner end of the pins 38, 38' are in contact with the circumferential shoulders 42 on the shaft S adjacent the cam 41 and therefore prevent endwise movement of the shaft S in the bore E.

The surfaces of the valve stem head 37 and of the head 39 of the pressure-transmitting element 38 are preferably made convex in shape so that there will be no sharp corners to cause possible rupture of the diaphragm 33 when the latter is flexed. In addition, the head of the pressure-transmitting element 38 engages the bottom of the cavity to limit the movement of said element into the bore E, and said head may be made larger in size than the opposing valve stem head 37 in order that the normal outward flexing action of the diaphragm 33 will not be unduly concentrated and subject the diaphragm to excessive wear.

A suitable handle or lever L may be secured to the outer end of the shaft S, whereby the latter can be turned approximately 90° of arc in either direction from an intermediate position, to open either one valve or the other while the opposite valve is automatically closed. It is desirable to so place the cam 41 with relation to the axis of the shaft S that when the cam is in an intermediate position both of the valves will be closed. As a check to limit the movement of the lever L at each end of its swing so that the valves will be opened to their fullest extent, a pin 43 may be inserted in a drilling in the shaft S adjacent the body A and a stop 44 may be provided on the body A. The lever L, which is rigidly keyed to the shaft and held by a suitable cap screw 45, is desirably formed in the shape of an arrow or pointer so as to indicate which of the valves is open by the direction of the pointed head 46.

The operation of the valve will be apparent from the foregoing description. When the lever L is thrown to the left, as shown in Fig. 1, the valve 25 in cavity B will be opened by the action of the pressure-transmitting element 38 on the diaphragm 33 and on valve stem 36 as the cam 41 bears against the element 38. At the same time the opposing pressure transmitting element 38' will rest between the shoulders 42 on the shaft S with no pressure being exerted thereon. A rotation of the shaft S through 90° of arc will then release the element 38 and permit the springs 26, 26' to close both of the valves 25, 25'. A further 90° swing of the lever to the extreme right brings pressure to bear on the element 38' and opens valve 25', while the valve 25 continues to remain closed. A positive, forceful action is thus required to unseat either of the valves and while both valves cannot be opened at the same time in the construction here shown, it is obvious that such operation may be effected, if desired, by substituting an appropriate operating means for the one shown, e. g. by changing the shape of the cam 41 on the shaft S as shown at 41a in Fig. 7.

Another valve embodying this invention is shown in part in Fig. 5, and is similar in general to the valve shown in Fig. 1 except that the bushing 50 thereof is open at the outer, instead of at the inner, end of the bore 51, for inserting the valve and its closing spring in the valve chamber; and a valve seat 52 is formed integral with the inner end of the bushing 50. The valve 53 and the closing spring 54 may then be inserted from the outer end of the bushing 50 and retained within the bore 51 by a ring 55 which is threadedly secured in the outer end of the bore 51. Furthermore, in this construction the side walls of the cavities B', C' are threaded inwardly beyond the entrances of the branch passages, and a plain threaded clamping ring 56 is screwed into each cavity, to clamp a diaphragm against an internal shoulder in the cavity as in the valve shown in Fig. 1. Here, the bushing need not bear against the clamping ring, so the inner end of the bushing may be sufficiently spaced from the clamping ring to permit free flow of fluid between the valve ports and the branch passages in the body, thus eliminating the circumferential groove and radial passages in each clamping ring.

Still another valve, embodying this invention is shown in part in Fig. 6; and, excepting differences in details, is generally similar to those shown in Figs. 1 and 5. Here, the inner end of the valve chamber 60 in the bushing 61 is threaded to receive the threaded end of a plug 62 which has a central valve port 63 and a raised valve seat 64 encircling the inner end of said port. Also, the diaphragm clamping ring 65 is threaded to screw into the cavity, so it may be spaced from the inner end of the bushing and will be held in place independently of said bushing. The ring 65 may be provided with a circumferential groove 66 adapted to fit opposite the entrance of the branch passage in the body A; and radial passages 67 extend through the ring from said groove. To further reduce the dimension of the valve axially of the cavities, the internal diameter of the clamping ring 65 may be sufficient to receive part of the head of the plug 62. Leakproof joints are thus provided at the entrance of the cavity; between the plug and the bushing; and at the margin of the diaphragm.

Suitable conduit connections may be provided for the several valve bushings, as shown in Fig. 6, for example, such a connection may comprise a flared tube 70 into which a conduit 71 may be secured and tightly soldered, as at 72. The end of the flared tube 70 is preferably rounded so as to fit within the bevelled or tapered area at the base of the threads in the bushing 60, against which the tube 70 may be forced by a gland nut 73 acting against a shoulder 74 on the tube. It is preferred to have the gland nut 73 fit loosely over the tube 70 so that the nut may be tightened into the threaded entrance of the bushing 60 by a wrench or other convenient tool.

While several embodiments of this invention have been illustrated and described, it will be understood that some parts of the improved valve may be used without others, and various other changes may be made in the constructions disclosed, without departing from the principles of this invention.

I claim:—

1. A valve comprising a body having a cavity, a bore having an axis perpendicular to the longitudinal axis of said cavity, a partition therebetween comprising the circumferential wall of said bore, an opening through said partition; a valve in said cavity; and means for operating said valve comprising fluid sealing means between said bore and said valve; a rotatable shaft in said bore, and a pressure transmitting element operable by rotation of said shaft, extending through said opening into said cavity, and contacting said shaft and said means.

2. A valve comprising a body having a cavity, a bore, a partition therebetween, and an opening through said partition; a valve in said cavity; and means for operating said valve comprising a turnable shaft in said bore, a cam on said shaft, said cam being smaller than said bore, and a pressure transmitting element operable by said cam and extending through said opening into said cavity, said element being constructed and arranged to retain said shaft in said bore.

3. A valve comprising a body having a cavity, a bore, the axes of the cavity and said bore intersecting, a partition between the cavity and said bore, and an opening through said partition; a valve in said cavity; and means for operating said valve comprising a shaft in said bore and a pressure transmitting element operable by said shaft and extending through said opening into said cavity, said shaft being of substantially the same diameter as said bore and having a cam portion; and said element fitting slidably in said opening, being engageable by said cam and bearing against shoulders on said shaft to restrain at all times endwise movement of said shaft in said bore.

4. A valve comprising a body having a cavity, a bore, the longitudinal axes of said cavity and bore intersecting at a right angle, a partition therebetween, and an opening through said partition; a valve in said cavity; and means for operating said valve comprising a shaft rotatably disposed in said bore in direct surface engagement therewith, a pressure-transmitting element operable by said shaft and extending through said opening into said cavity, and a diaphragm between said valve and said element.

5. A valve comprising a body having a cavity, a bore, the longitudinal axes of said cavity and a bore, intersecting at a right angle, a partition bore intersecting at a right angle, a partition therebetween, and an opening through said partition; a valve in a valve chamber in said cavity; and means for operating said valve comprising a shaft rotatably disposed in said bore in direct surface engagement therewith, a pressure-transmitting element operable by said shaft and extending through said opening into said cavity, and a diaphragm sealing said valve chamber from said bore.

6. A valve comprising a body provided with a cavity having an opening through the bottom wall thereof; a bushing coupled to said body in said cavity and having a bore constituting a valve chamber; a wall at the inner end of said chamber having a port; a valve in said chamber controlling said port; spring means in said chamber tending to seat said valve; and means for unseating said valve comprising a pressure-transmitting element extending through said opening in said bottom wall, a diaphragm bearing against said element and providing a seal between said port and said opening; a stem connected to said valve and bearing against said diaphragm, and means for operating said element.

7. A valve according to claim 6, in which the valve-operating means comprises a diaphragm; said valve stem has a head; said pressure-transmitting element has a head; and said heads severally bear against opposite faces of said diaphragm.

8. A valve according to claim 6, in which said bushing has a fluid passage leading into the outer end of said valve chamber, and said body has a fluid passage communicating with said cavity.

9. A valve according to claim 6, in which said bushing and the ported wall at the inner end thereof are normally in fluid-tight engagement but are separable to permit the removal of said valve and said spring means from the valve chamber.

10. A valve according to claim 6, in which said cavity has an annular shoulder therein, and said diaphragm is clamped against said shoulder.

11. A valve according to claim 6, in which said cavity has a fluid outlet or inlet opening in its side wall and a shoulder between the openings in the side and bottom walls, and a member having an annular surface which engages said diaphragm and clamps it fluid-tight against said shoulder.

12. A valve according to claim 6, in which said cavity has an annular shoulder, in combination with a clamping ring secured in said cavity and bearing against said diaphragm to hold the same fluid tightly against said shoulder.

13. A valve according to claim 6, in which the wall at the inner end of said valve chamber is removably secured to said bushing.

14. A valve according to claim 6, in which the bottom wall and valve seat of the valve chamber are integral with said bushing, and the top of said chamber is closed by a removable ring.

15. A valve according to claim 6, in which said valve slidably engages the side wall of said valve chamber and is guided thereby.

16. A valve according to claim 6, in which said body and said bushing are each provided with a fluid passage, respectively leading to said cavity and to said valve chamber.

17. A valve comprising a body having cavities, a bore between said cavities, and openings connecting said cavities and said bore; valves in said cavities; fluid sealing means between said openings and said valves; valve-operating elements extending through said openings; and means disposed in said bore in direct surface engagement therewith for actuating said elements, said fluid sealing means acting to isolate said elements and actuating means from fluids passed through said valve.

18. A valve comprising a body having cavities and a bore between said cavities; valves in said cavities; fluid sealing means between said bore and said valves; and mechanism, including means disposed in said bore in direct surface engagement therewith, for operating said valves, said fluid sealing means isolating said mechanism from fluids passed through said valve.

19. A valve according to claim 18, in which said means in said bore comprises a cam operable to unseat both of said valves simultaneously.

20. A valve comprising a body having cavities and a bore between said cavities; valves in said cavities; fluid sealing means between said bore and said valves; and mechanism, including means in said bore, for operating said valves, the valve operating mechanism comprising a shaft journalled in said bore, and said shaft comprising a cam portion of smaller diameter than said bore.

21. A valve comprising a body having cavities and a bore between said cavities; valves in said cavities; fluid sealing means between said bore and said valves; and mechanism, including means in said bore, for operating said valves, the wall of said bore having oppositely-disposed openings connecting the bore and said cavities, and the valve-operating mechanism comprising a cam opposite said openings and of smaller size than said bore, in combination with elements engageable by said cam and severally projecting through said openings into said cavities.

22. A valve comprising a body having cavities and a bore between said cavities; the wall of said bore having oppositely-disposed openings connecting the bore and said cavities; valves in said cavities; and mechanism, including means disposed in said bore in direct surface engagement therewith, for operating said valves; in combination with a diaphragm in each cavity to prevent fluid leakage through said openings, said diaphragms constituting elements of the valve-operating mechanism, and isolating said means from fluids passed through said valve.

23. A valve comprising a body having cavities and a bore between said cavities; the wall of said bore having openings connecting the bore and said cavities; valves in said cavities; and mechanism for operating said valves comprising means disposed in said bore in direct surface engagement therewith, diaphragms in said cavities sealing said openings, and pressure-transmitting elements extending through said openings and cooperating with said diaphragms and with said means in the bore, said diaphragm isolating said elements and means from fluids passed through said valve.

24. A valve according to claim 18, in which the wall of said bore has openings axially in line with said cavities to connect the latter to said bore, said valves are movable along the common axis of said cavities and openings, and said mechanism includes elements extending through said openings and operable to actuate said valves.

25. A valve comprising a body having cavities and a bore between said cavities; valves in said cavities; and mechanism, including means in said bore, for operating said valves; the wall of said bore having openings axially in line with said cavities to connect the latter to said bore; said valves being movable along the common axis of said cavities and having stems extending toward said openings; said mechanism including pressure-transmitting elements extending through said openings toward said stems and operable by said means in said bore; and a diaphragm in each cavity to prevent fluid leakage through said openings, the opposite faces of each diaphragm being engageable by one of said elements and one of said valve stems.

26. A valve comprising a body having cavities and a bore between said cavities; valves in said cavities; fluid sealing means between said bore and said valves; and mechanism, including means in said bore, for operating said valves, said body having a main fluid passage and branch passages leading therefrom to said cavities, and a bushing in each of said cavities having a fluid passage therethrough, each bushing housing a valve which controls the flow of fluid therethrough.

27. A throw-over valve comprising a body having cavities, a bore between said cavities, openings through the wall of said bore into said cavities, a main fluid passage, and branch passages leading from said main passage to said cavities; bushings coupled to said body in said cavities and having fluid passages therethrough; valves and said bushings controlling the flow of fluid therethrough; a shaft journalled in said bore and having cam means opposite said openings; diaphragms clamped in said cavities between said openings and the entrances of said branch passages into said cavities; pressure-transmitting elements in said openings and between said diaphragms and said cam means; and valve stems between said diaphragms and said valves.

28. A multiple-way valve comprising a valve body having a main passage therethrough, two coaxial cavities therein, a bore perpendicular to and intersecting the common axis of the cavities, and branch passages connecting the respective cavities with the main passage; a spring-closed valve in each cavity; an operating member in the bore, said operating member having a cam thereon; and means actuated by the cam for opening each valve.

29. A duplex valve comprising a body having coaxial end chambers, a third chamber disposed between said end chambers and having its axis disposed at right angles to the common axis of said end chambers, and ports connecting said third chamber to said end chambers; valves controlling said ports; and means disposed in said third chamber in direct surface engagement therewith for operating said valves.

30. A duplex valve according to claim 29, in which said body has fluid passages severally opening into each of said chambers, and said valves are operable to control the fluid flow in either direction through said passages.

HARRY J. BAKER.